United States Patent
Khabiri et al.

(10) Patent No.: US 9,794,550 B2
(45) Date of Patent: *Oct. 17, 2017

(54) EYE-FATIGUE REDUCTION SYSTEM FOR HEAD-MOUNTED DISPLAYS

(71) Applicant: INTERNATIONAL BUSINESS MACHINES CORPORATION, Armonk, NY (US)

(72) Inventors: Elham Khabiri, Yorktown Heights, NY (US); James R. Kozloski, New Fairfield, CT (US); Clifford A. Pickover, Yorktown Heights, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 37 days.

This patent is subject to a terminal disclaimer.

(21) Appl. No.: 14/969,263

(22) Filed: Dec. 15, 2015

(65) Prior Publication Data
US 2017/0127055 A1  May 4, 2017

Related U.S. Application Data

(63) Continuation of application No. 14/931,136, filed on Nov. 3, 2015.

(51) Int. Cl.
*H04N 13/04* (2006.01)
*G06K 9/00* (2006.01)
(Continued)

(52) U.S. Cl.
CPC ..... *H04N 13/0459* (2013.01); *G02B 27/0172* (2013.01); *G06K 9/00617* (2013.01);
(Continued)

(58) Field of Classification Search
None
See application file for complete search history.

(56) References Cited

U.S. PATENT DOCUMENTS

| 9,201,242 B2* | 12/2015 | Miyawaki | G02B 27/017 |
| 2006/0019614 A1* | 1/2006 | Yamasaki | G02B 27/017 455/90.2 |
| 2010/0328432 A1* | 12/2010 | Tanaka | H04N 5/23219 348/46 |

OTHER PUBLICATIONS

Elham Khabiri, et al., Pending U.S. Appl. No. 14/931,136 entitled "Eye-Fatigue Reduction System for Head-Mounted Displays," filed with the U.S. Patent and Trademark Office on Nov. 3, 2015.

(Continued)

*Primary Examiner* — Kenneth B Lee, Jr.
(74) *Attorney, Agent, or Firm* — Cantor Colburn LLP; Vazken Alexanian (57) ABSTRACT

Embodiments include method, systems and computer program products for reducing eye-fatigue for users of binocular head-mounted displays. Aspects include displaying a content item by a display device of the binocular head-mounted display and calculating an estimated eye-fatigue of the user of the binocular head-mounted display. Based on a determination that the estimated eye-fatigue of the user exceeds a threshold level, aspects also include modifying the content item, by the processor, to encourage the user to take an eye-fatigue reduction action and displaying the modified content item by the display device of the binocular head-mounted display.

8 Claims, 4 Drawing Sheets

(51) Int. Cl.
*H04N 13/00* (2006.01)
*G02B 27/01* (2006.01)

(52) U.S. Cl.
CPC ... *H04N 13/0022* (2013.01); *G02B 2027/014* (2013.01); *G02B 2027/0134* (2013.01); *H04N 2013/0081* (2013.01); *H04N 2213/002* (2013.01)

(56) References Cited

OTHER PUBLICATIONS

List of IBM Patents or Patent Applictions Treated as Related; (Appendix P), Filed Jan. 28, 2016, 2 pages.

\* cited by examiner

EYE-FATIGUE REDUCTION SYSTEM FOR HEAD-MOUNTED DISPLAYS

DOMESTIC PRIORITY

This application is a continuation application of the legally related U.S. Ser. No. 14/931,136 filed Nov. 3, 2015, the contents of which are incorporated by reference herein in their entirety.

BACKGROUND

The present disclosure relates to eye-fatigue reduction and more specifically, to methods, systems and computer program products for reducing eye-fatigue for users of head-mounted displays.

Head-mounted displays (HMDs) are a type of display device that is worn on the head of a user. HMDs typically include a display device and associated optics that are disposed near the user's eyes. In general, HMDs are configured to show stereoscopic imagery, which is an image that creates an impression of depth to the user. A binocular HMD is a particular type of HMD that is configured to display a different image to each eye of the user. HMDs can be used to create a remarkable sense of visual immersion and 3D stereoscopic depth. As a result, the use of head-mounted displays is projected to grow in popularity. The virtual reality applications for HMDs are many including, but not limited to, human research, education, engineering and scientific visualization, training, simulations, gaming, video display and the like.

One drawback to using a HMD is that the display and optics are disposed close to the user's eyes and using the HMD for an extended period of time can cause the user to experience eye-fatigue.

SUMMARY

In accordance with an embodiment, a method for reducing eye-fatigue for users of binocular head-mounted displays is provided. The method includes displaying a content item by a display device of the binocular head-mounted display and calculating an estimated eye-fatigue of the user of the binocular head-mounted display. Based on a determination that the estimated eye-fatigue of the user exceeds a threshold level, aspects also include modifying the content item, by the processor, to encourage the user to take an eye-fatigue reduction action and displaying the modified content item by the display device of the binocular head-mounted display.

In accordance with another embodiment, an eye-fatigue reduction system that includes a processor in communication with one or more types of memory and a user display. The processor is configured to receive a content item from the memory, display the content item by the display device of the binocular head-mounted display and calculate an estimated eye-fatigue of the user of the binocular head-mounted display. Based on a determination that the estimated eye-fatigue of the user exceeds a threshold level, the processor is configured to modify the content item to encourage the user to take an eye-fatigue reduction action and display the modified content item by the display device of the binocular head-mounted display.

In accordance with a further embodiment, a computer program product for reducing eye-fatigue for users of binocular head-mounted displays includes a non-transitory storage medium readable by a processing circuit and storing instructions for execution by the processing circuit for performing a method. The method includes displaying a content item by a display device of the binocular head-mounted display and calculating an estimated eye-fatigue of the user of the binocular head-mounted display. Based on a determination that the estimated eye-fatigue of the user exceeds a threshold level, aspects also include modifying the content item, by the processor, to encourage the user to take an eye-fatigue reduction action and displaying the modified content item by the display device of the binocular head-mounted display.

BRIEF DESCRIPTION OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

In accordance with exemplary embodiments of the disclosure, methods, systems and computer program products for reducing eye-fatigue for users of binocular head-mounted displays are provided. In exemplary embodiments, a binocular head-mounted display (HMD) is configured to calculate an eye-fatigue level of a user of the HMD and to responsively alter the content being shown to the user to encourage the user to take an eye-fatigue reduction action. In exemplary embodiments, the eye-fatigue level of the user can be calculated based on a variety of metrics that include, but are not limited to, duration of use of the HMD, characteristics of the content displayed by the HMD, characteristics of the eyes of the user of the HMD, or the like. In exemplary embodiments, the eye-fatigue reduction action can include the user changing a depth of the user's vision (i.e., focusing their vision on an object that appears to be far away), blinking, or the like. In exemplary embodiments, the HMD may be used in to create a virtual reality experience that can be used for gaming, educational settings, worker training, etc.

In exemplary embodiments, the content being shown to the user is altered in a manner that encourages a user to focus on what appears to be a far-away object. For example, a stereoscopic depth can be changed for one or more pieces of on-screen content. In this way, vergence muscles in the eyes may be relaxed and allowed to recover from their fatigue by constant vergence eye movements. A vergence is the simultaneous movement of both eyes in opposite directions to obtain or maintain single binocular vision.

When a person looks at an object, their eyes must rotate around a vertical axis so that the projection of the image is in the center of the retina in both eyes. To look at an object closer by, the eyes rotate towards each other (convergence), while for an object farther away they rotate away from each other (divergence). Exaggerated convergence is called cross eyed viewing (focusing on the nose for example). When looking into the distance, the eyes diverge until parallel, effectively fixating the same point at infinity (or very far away). Vergence movements are closely connected to accommodation of the eye. Under normal conditions, changing the focus of the eyes to look at an object at a different distance will automatically cause vergence and accommodation, sometimes known as the accommodation-convergence reflex.

In general, viewing a distant object, with parallel eye conditions, allow muscles in the eyes to relax, which is why periodic distant viewing is advised when working at a computer terminal. In a virtual reality environment produced by a HMD, the binocular nature of the system also causes vergence eye movements which may be detected. Distant viewing may then be not only advised, but directly produced by changing the objects' distance in the display.

Figure 1:
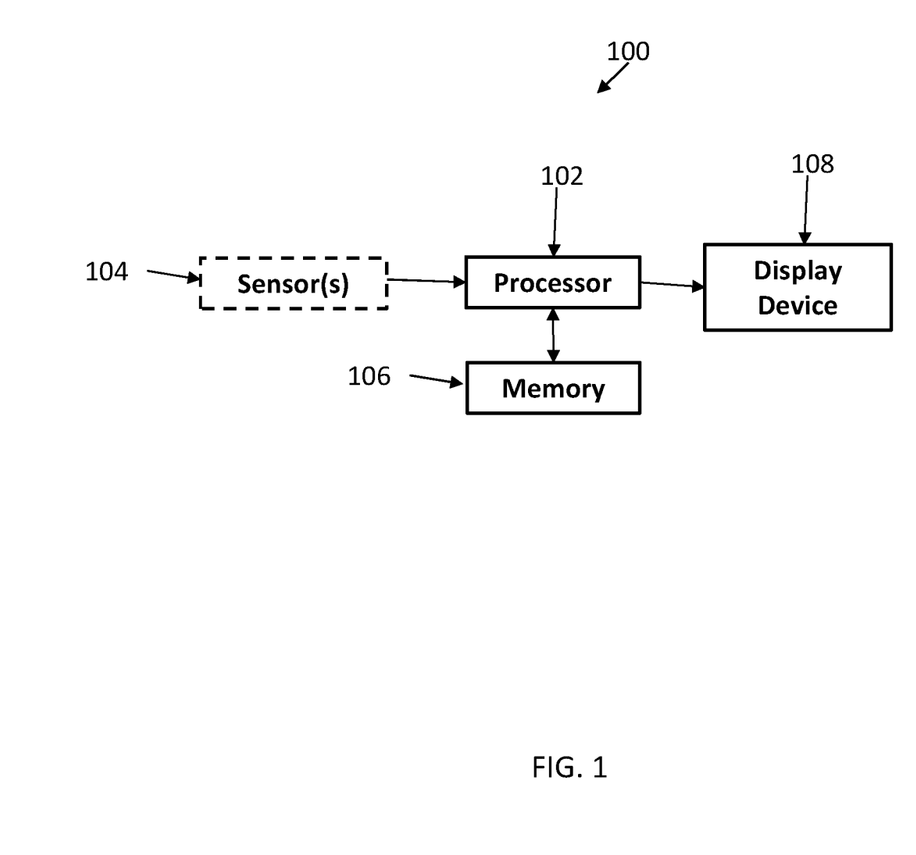
FIG. 1 is a block diagram an binocular head-mounted display device in accordance with an exemplary embodiment.

Referring to FIG. 1, there is shown a block diagram of an embodiment of a binocular head-mounted display 100. As illustrated, the binocular head-mounted display 100 includes a processor 102 that is configured to display a content item on a display device 108. In exemplary embodiments, the display device 108 is a binocular HMD that is configured to create a stereoscopic version of the content item. The processor 102 is communicatively coupled to a memory 106 that is used to store a content item that will be displayed on the display device 108. In exemplary embodiments, the binocular head-mounted display 100 may also include one or more sensors 104 that are communicatively coupled to the processor 102. In exemplary embodiments, the sensors 104 may include, but are not limited to, an accelerometer, light sensors (such as a photodiode), a gyroscope, electrodes or the like. In exemplary embodiments, the processor 102 is configured to determine an eye-fatigue level of the user of the HMD 100 based on information received from the sensors 104 and from information regarding the content item being displayed.

Figure 2:
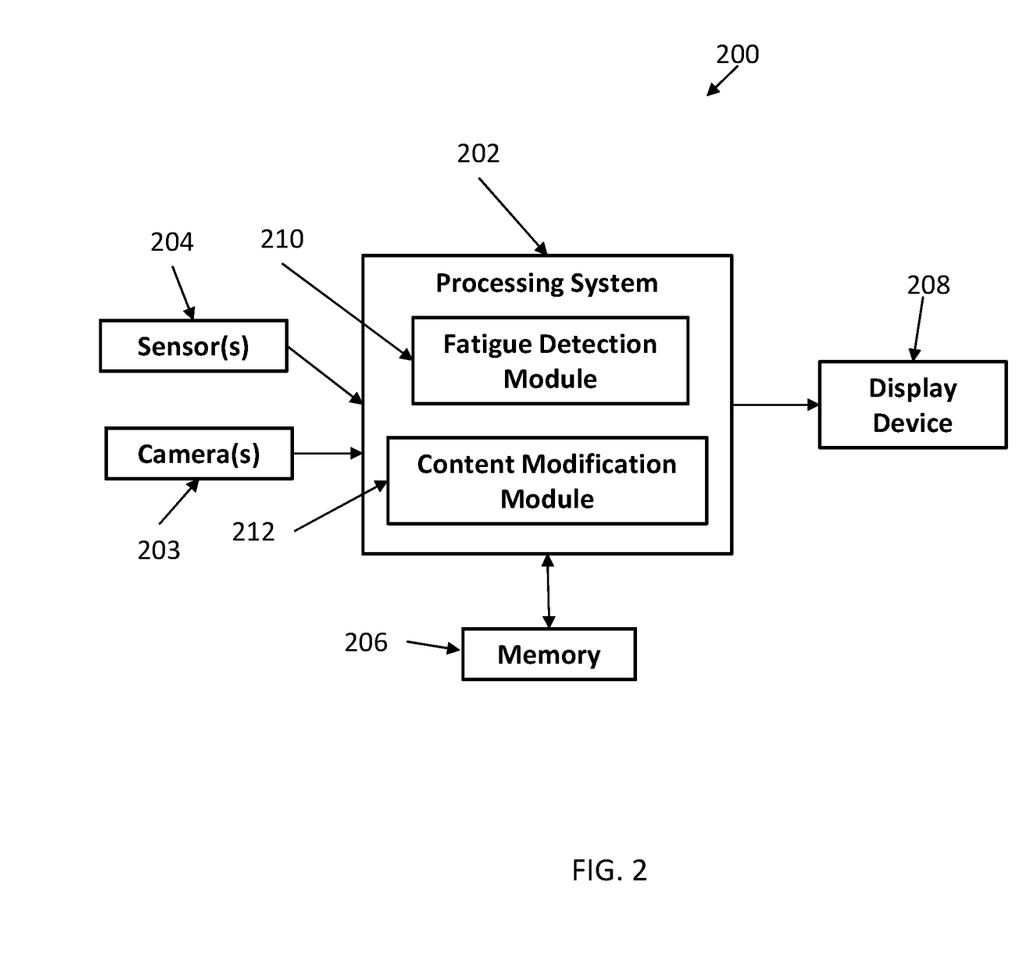
FIG. 2 is a block diagram illustrating another binocular head-mounted display device in accordance with an exemplary embodiment.

Referring now to FIG. 2, there is shown a binocular head-mounted display 200 in accordance with another embodiment. As illustrated, the binocular head-mounted display 200 includes a processing system 202 that is configured to display a content item on a display device 208. The processing system 202 is communicatively coupled to a memory 206 that is used to store a content item that will be displayed on the display device. In exemplary embodiments, the binocular head-mounted display 200 may also include one or more sensors 204 that are communicatively coupled to the processing system 202. In exemplary embodiments, the sensors 204 may include, but are not limited to, an accelerometer, light sensors (such as a photodiode), a gyroscope, or the like. The HMD 200 also includes a camera 203 that is configured to monitor the eyes of the user of the HMD.

In exemplary embodiments, the processing system 202 includes a fatigue detection module 210 and a content modification module 212. The fatigue detection module 210 is configured to receive video of the user's eyes from the camera 203 and to analyze one or more characteristics of the eyes to determine an eye-fatigue level of the user of the HMD 200. The fatigue detection module 210 is also configured to receive inputs from the one or more sensors 204 that can also be used to determine an eye-fatigue level of the user of the HMD 200. The content modification module 212 is configured to modify content items to be displayed to the user to insert, or modify, objects in the content item to encourage the user to take a fatigue reduction action.

In exemplary embodiments, the processor is a hardware device for executing hardware instructions or software, particularly that stored in a non-transitory computer-readable memory (e.g., memory). Processor can be any custom made or commercially available processor, a central processing unit (CPU), a plurality of CPUs, a semiconductor based microprocessor (in the form of a microchip or chip set), or generally any device for executing instructions. Processor can include a memory cache, which may include, but is not limited to, an instruction cache to speed up executable instruction fetch, a data cache to speed up data fetch and store, and a translation lookaside buffer (TLB) used to speed up virtual-to-physical address translation for both executable instructions and data.

In exemplary embodiments, the memory can include random access memory (RAM) and read only memory (ROM). The RAM can be any one or combination of volatile memory elements (e.g., DRAM, SRAM, SDRAM, etc.). ROM can include any one or more nonvolatile memory elements (e.g., erasable programmable read only memory (EPROM), flash memory, electronically erasable programmable read only memory (EEPROM), programmable read only memory (PROM), tape, compact disc read only memory (CD-ROM), disk, cartridge, cassette or the like, etc.). Moreover, memory 106 may incorporate electronic, magnetic, optical, and/or other types of non-transitory computer-readable storage media.

The instructions in memory may include one or more separate programs, each of which comprises an ordered listing of computer-executable instructions for implementing logical functions. In one example, the instructions in memory 106 may include a suitable operating system that is configured to control the execution of other computer programs and provides scheduling, input-output control, file and data management, memory management, video generation and modification and communication control and related services.

In exemplary embodiments, the display device can include one or more displays and optics associated therewith. The displays can include a liquid crystal display (LCD), light emitting diode (LED) display, organic light emitting diode (OLED) display or any other known type of display. In exemplary embodiments, the display device may be removably affixed to the HMD. For example, the display device may be a display of a smartphone that is configured to be selectively disposed in the HMD. Likewise, one or more of the processor, memory, sensors and camera may also be removably affixed to the HMD. For example, the processor, memory and sensors may be disposed in a smartphone that is configured to be selectively disposed in the HMD.

Figure 3:
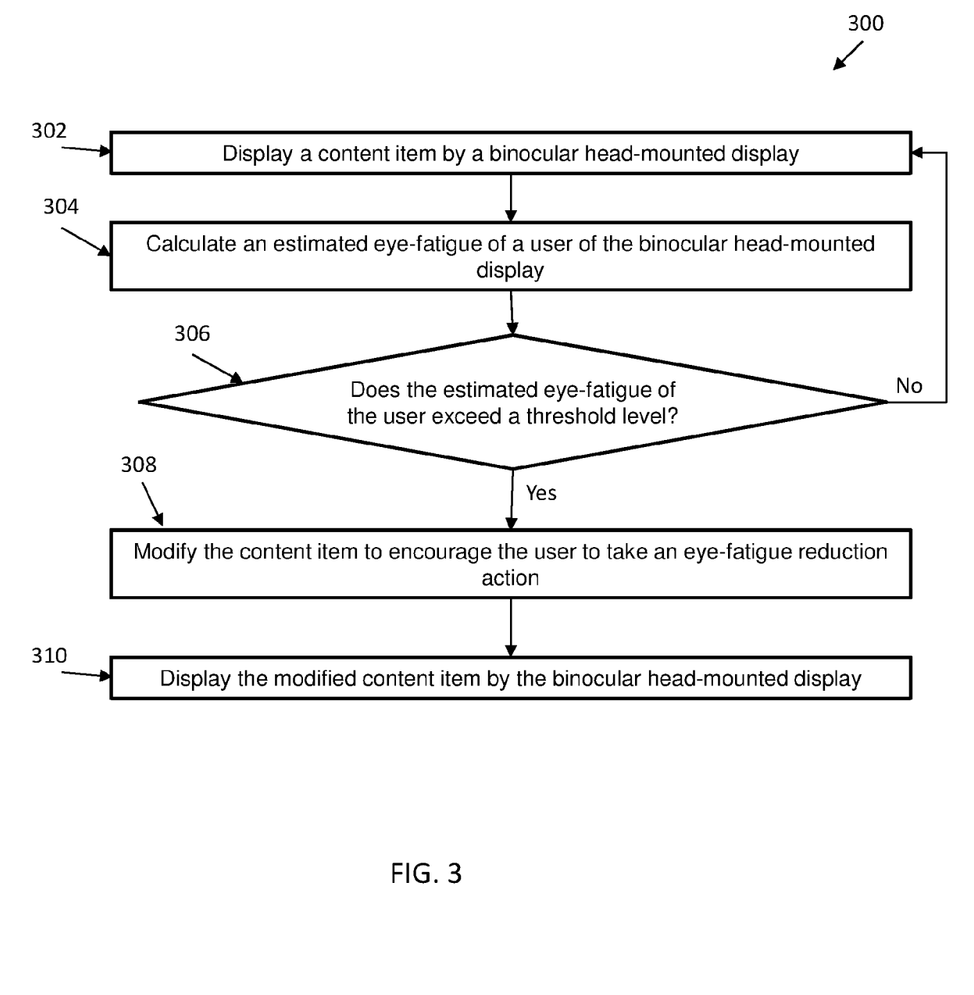
FIG. 3 is a flow diagram of a method for reducing eye-fatigue for a user of a binocular head-mounted display device in accordance with an exemplary embodiment.

Referring now to FIG. 3, a flow diagram of a method 300 for reducing eye-fatigue of a user of a binocular head-mounted display in accordance with an exemplary embodiment is shown. As shown at block 302, the method 300 includes displaying a content item by a binocular head-mounted display. Next, as shown at block 304, the method 300 includes calculating an estimated eye-fatigue of the user of the binocular head-mounted display. In exemplary embodiments, the estimated eye-fatigue of the user can be calculated based on a variety of factors that can include, but are not limited to, one or more of: a duration of use of the head mounted display; a mean stereoscopic depth of object in the content item; a standard deviation of the stereoscopic depth of objects in the content item; movement of the user's head as determined by an accelerometer or gyroscope in the HMD; brain activity of the user as monitored by one or more electrodes in the HMD; or the like.

Continuing with reference to FIG. 3, the method 300 also includes determining if the estimated eye-fatigue of the user exceeds a threshold level, as shown at decision block 306. In exemplary embodiments, the threshold level is determined based on a user profile of the user. The user profile includes a plurality of threshold values of eye-fatigue levels that can be selected based on personal information of the user, such as age, gender, medical conditions, etc. In exemplary embodiments, the plurality of threshold values of eye-fatigue levels stored in the user profile may be obtained based on statistics collected from a large population sample. Next, as shown at block 308, the method 300 includes modifying the content item to encourage the user to take an eye-fatigue reduction action. In exemplary embodiments, the eye-fatigue reduction action includes one or more of focusing on a specific object in the modified content item and blinking. The method 300 also includes displaying the modified content item by the display device of the binocular head-mounted display, as shown at block 310.

Figure 4:
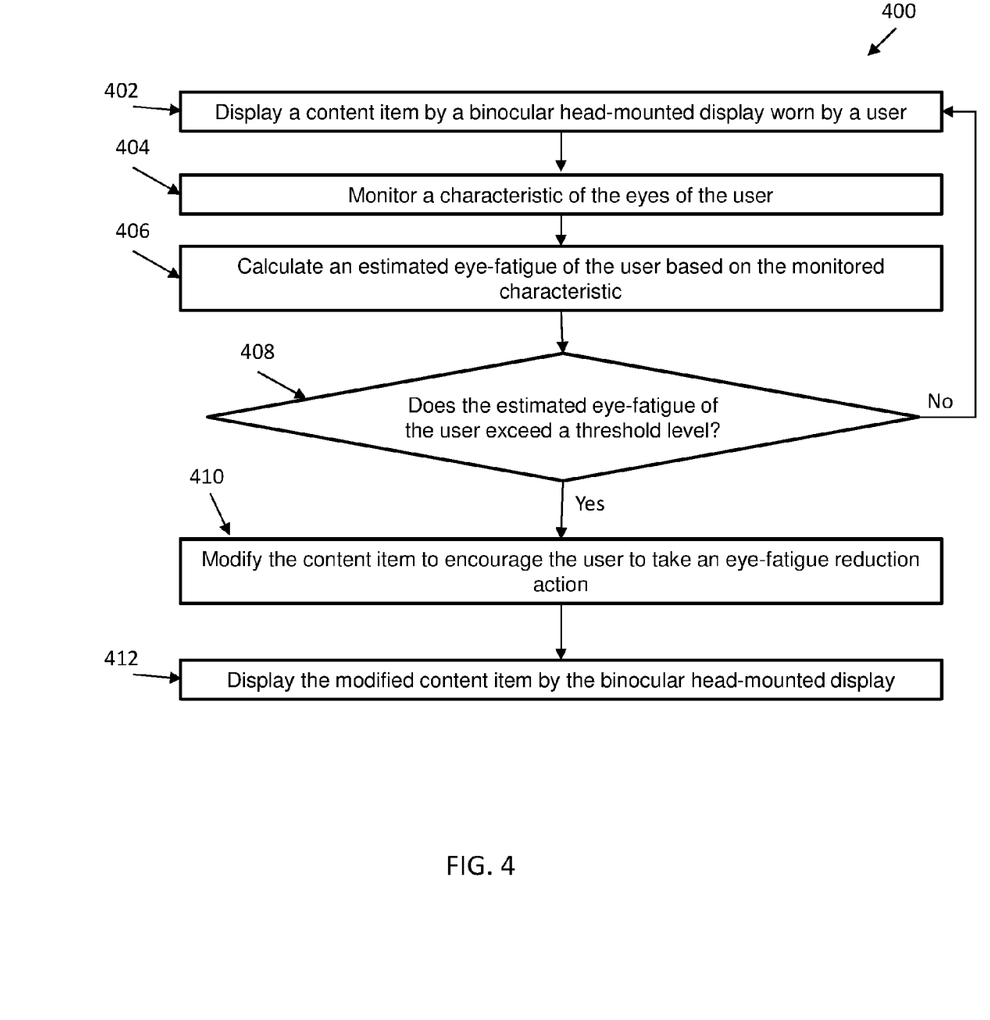
FIG. 4 is another flow diagram of a method for reducing eye-fatigue for a user of a binocular head-mounted display device in accordance with an exemplary embodiment.

Referring now to FIG. 4, a flow diagram of another method 400 for reducing eye-fatigue of a user of a binocular head-mounted display in accordance with an exemplary embodiment is shown. As shown at block 402, the method 400 includes displaying a content item by a binocular head-mounted display. Next, as shown at block 404, the method 400 includes monitoring a characteristic of the eyes of the user of the HMD. The method 400 also includes calculating an estimated eye-fatigue of the user of the binocular head-mounted display based, at least in part, on the monitored characteristic. In exemplary embodiments, the estimated eye-fatigue of the user can be calculated based on measurements of one or more characteristics of the user's eyes. For example, the head mounted display may use one or more cameras to observe the user's eyes and to measure characteristics of the user's eyes, such as a diameter of each pupil and a frequency and amount of change in the diameter of the pupils. In addition to the monitored characteristic of the user's eyes the estimated eye-fatigue of the user can be calculated based on a variety of factors that can include, but are not limited to, one or more of: a duration of use of the head mounted display; a mean stereoscopic depth of objects in the content item; a standard deviation of the stereoscopic depth of objects in the content item; movement of the user's head as determined by an accelerometer or gyroscope in the HMD; brain activity of the user as monitored by one or more electrodes in the HMD; or the like.

Continuing with reference to FIG. 4, the method 400 also includes determining if the estimated eye-fatigue of the user exceeds a threshold level, as shown at decision block 408. In exemplary embodiments, the threshold level is determined based on a user profile of the user. The user profile includes a plurality of threshold values of eye-fatigue levels that can be selected based on personal information of the user, such as age, gender, medical conditions, etc. In exemplary embodiments, the plurality of threshold values of eye-fatigue levels stored in the user profile may be obtained based on statistics collected from a large population sample. Next, as shown at block 410, the method 400 includes modifying the content item to encourage the user to take an eye-fatigue reduction action. In exemplary embodiments, the eye-fatigue reduction action includes one or more of focusing on a specific object in the modified content item and blinking. The method 400 also includes displaying the modified content item by the display device of the binocular head-mounted display, as shown at block 412.

In exemplary embodiments, modifying the content item can include generating an object in the content item that has stereoscopic depth that is greater than a fixed distance. For example, if the content item is a video game, modifying the content item may include inserting an object into the video game that has a stereoscopic depth that is greater than an average stereoscopic depth of the objects in the video game. In one embodiment, the content item is configured to have a stereoscopic depth that makes the inserted item appear to be at least twice the average stereoscopic depth of the objects in the video game. In addition, modifying the content may include taking one or more actions to encourage the user to focus on the inserted object. In exemplary embodiments, by changing the user's focus to an inserted object that appears to be far away, the eye-fatigue of the user can be reduced.

In exemplary embodiments, the objects may be advertisements or items that are selected to get the attention of a user. The system may be configured to learn what types of objects a user is more likely to pay attention to and look at, according to various cohorts (a person with Autism, a student, an adult, etc.) and based on user profile. In one embodiment, the object may be a message that appears in the distance that indicates a user should blink, which tends to reduce dry eye problems. This serves a dual purpose of having a user not always gazing at close objects but also inducing a blink, which a user may actually appreciate if his or her eyes become less fatigued in the long run. In one embodiment, such messages may appear on "blimps" or written in the sky by graphical representations of air planes. In exemplary embodiments, a user may be rewarded when he or she changes their focus to such a message.

The system may learn what stimuli (objects), and what distances are most effective in reducing fatigue for particular users. In exemplary embodiments, the system may be adapted to differentially apply different distances to stare at, dependent on a user's condition or tendency: In exemplary embodiments, the systems can detect Strabismus and Esotropia and can alter the display device to accommodate users with these conditions. Strabismus is a vision disorder in which the eyes don't look in exactly the same direction at the same time. Esotropia is a form of strabismus, or "squint," in which one or both eyes turns inward. Strabismus may cause amblyopia due to the brain ignoring one eye.

The most extreme forms of vergence eye movements involve looking at one's own nose, which typically causes the eye to become crossed. In general, viewing beyond the nose creates a blurred image of the nose during all viewing conditions a human with a normal sized nose encounters. However, this reference of the blurred nose is absent in current HMD simulated environments. Accordingly, in one embodiment, the content item to be displayed by the HMD and be altered to include a blurred nose to restore the reference, realism, and possibly a means to encourage more natural vergence eye movements.

In exemplary embodiments, one or more characteristics of a user can be entered into a user profile or they can be inferred by the type of content items that they view, such as the types of movies the user watches or the type of games the user plays. In addition, the types of objects that are likely to draw the attention of a specific user can be tracked via usage of the HMD and saved in the user profile. For example, the system can determine which objects a user pays attention to based eye-tracking, a history of responding to prompts on such objects, etc. Thus, the system can be configured to learn one or more characteristics of the user and can use this information to determine when his eyes are estimated to be tired (or, for example, he has been staring at near objects to far objects over time period T in a ratio of 10:1). Based on the determination that the user is likely experiencing eye-fatigue, the system will coax the user to look at an object that is likely to get his attention at an appropriate stereoscopic depth. For example, if T(near)/T(far)>10 for the past half hour, then trigger the insertion of an object, estimated to catch the user eyes, that is far away in the sense of eye gaze characteristics within an HMD.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method for reducing eye-fatigue for a user of a binocular head-mounted display, the method comprising:
    displaying a content item by a display device of the head-mounted display;
    calculating, by a processor, an estimated eye-fatigue of the user of the binocular head-mounted display;
    based on a determination that the estimated eye-fatigue of the user exceeds a threshold level, modifying the content item, by the processor, to encourage the user to take an eye-fatigue reduction action that includes inserting an object into the content item having a stereoscopic depth that is greater than a fixed distance; and
    displaying the modified content item by the display device of the binocular head-mounted display.

2. The computer-implemented method of claim 1, wherein the estimated eye-fatigue of the user is calculated based on measurements of one or more characteristics of the user's eyes.

3. The computer-implemented method of claim 1, wherein modifying the content item includes inserting a reference object into the content item that is visible during use of the binocular head-mounted display.

4. The computer-implemented method of claim 1, wherein the fixed distance is determined to be at least twice a mean stereoscopic depth of objects in the content item.

5. The computer-implemented method of claim 3, wherein the reference object is a rendition of a nose and wherein the reference object is inserted in a center of a field of view of the content item.

6. The computer-implemented method of claim 1, wherein the estimated eye-fatigue of the user is calculated based on duration of use of the binocular head mounted display.

7. The computer-implemented method of claim 6, wherein estimated eye-fatigue of the user is calculated based on a mean stereoscopic depth of objects in the content item and a standard deviation of the stereoscopic depth of the objects content item.

8. The computer-implemented method of claim 1, wherein the eye-fatigue reduction action includes one or more of focusing on the object inserted in the modified content item and blinking.

* * * * *